(12) United States Patent
Andrios

(10) Patent No.: US 10,827,682 B2
(45) Date of Patent: Nov. 10, 2020

(54) INDEPENDENT AIR CONTROLLED SIEVE

(71) Applicant: DEERE & COMPANY, Moline, IL (US)

(72) Inventor: John Andrios, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 155 days.

(21) Appl. No.: 16/149,743

(22) Filed: Oct. 2, 2018

(65) Prior Publication Data

US 2020/0100432 A1 Apr. 2, 2020

(51) Int. Cl.
*A01F 12/44* (2006.01)

(52) U.S. Cl.
CPC .......... *A01F 12/444* (2013.01); *A01F 12/448* (2013.01)

(58) Field of Classification Search
CPC ....... A01F 12/444; A01F 12/448; A01F 12/44
See application file for complete search history.

(56) References Cited

U.S. PATENT DOCUMENTS

| | | | |
|---|---|---|---|
| 1,956,507 A | 4/1934 | Johnson | |
| 3,116,236 A * | 12/1963 | Claas | A01F 12/444 209/26 |
| 3,640,383 A * | 2/1972 | Wantling | B07B 1/00 209/17 |
| 4,250,897 A * | 2/1981 | Glaser | A01D 67/00 415/7 |
| 4,511,466 A | 4/1985 | Jones et al. | |
| 6,053,812 A * | 4/2000 | Loewen | A01F 12/446 460/101 |
| 6,435,965 B2 | 8/2002 | Visagie | |
| 7,896,731 B2 * | 3/2011 | Schwinn | A01F 12/446 460/101 |
| 8,651,927 B1 * | 2/2014 | Roberge | A01F 12/444 460/101 |
| 9,179,603 B2 | 11/2015 | Regier | |
| 9,750,193 B2 * | 9/2017 | Bonte | A01F 12/446 |
| 2003/0140612 A1 * | 7/2003 | Gorden | A01F 12/446 56/100 |
| 2013/0210505 A1 * | 8/2013 | Bischoff | A01F 12/448 460/101 |
| 2016/0192591 A1 * | 7/2016 | Missotten | A01F 12/444 460/100 |
| 2017/0142904 A1 * | 5/2017 | Missotten | A01F 12/44 |
| 2018/0103589 A1 * | 4/2018 | Meschke | A01F 12/444 |

FOREIGN PATENT DOCUMENTS

| | | |
|---|---|---|
| DE | 1006651 B | 4/1957 |
| EP | 0629340 A1 | 12/1994 |
| EP | 3308626 A1 | 4/2018 |
| FR | 1180659 A | 6/1959 |
| WO | 2012111219 A1 | 8/2012 |

OTHER PUBLICATIONS

European Search Report issued in counterpart European Patent Application No. 19200834.0 dated Apr. 15, 2020 (9 pages).

* cited by examiner

*Primary Examiner* — Abigail A Risic
(74) *Attorney, Agent, or Firm* — Taft, Stettinius & Hollister LLP; Stephen F. Rost

(57) ABSTRACT

A sieve for a harvester, wherein the sieve has a plurality of louvers and a plurality of cross members adjacent to each one of the plurality of louvers. Wherein, each of the cross members have a fluid channel that directs a fluid through the plurality of louvers.

20 Claims, 7 Drawing Sheets

INDEPENDENT AIR CONTROLLED SIEVE

FIELD OF THE DISCLOSURE

The present disclosure relates to a sieve of a harvesting machine, and in particular, to a sieve that implements air flow to sieve harvested crop.

BACKGROUND

Combine harvesters are used in agriculture for harvesting crops which are gathered from the field, threshed-out, and separated. The crops obtained by threshing and separating are subsequently freed from undesired crop residues by a cleaning process. The cleaning process often includes a blower, which acts on sieves that move back and forth. As part of the cleaning process, lighter particles, such as chaff and the like, are separated from the grain by the air flow and the grain falls through the sieves and is taken to a grain tank. Many combine harvesters utilize an upper sieve placed above a lower sieve.

During operation, the upper sieves are often loaded on their front end with a mixture of grain and undesired crop debris, which reach the sieve via a falling stage. During the falling stage, air flow often directs the undesired crop debris toward the back while the grain is taken to the grain tank. With both sieves, the air flow leads to a separation between the grain and impurities so that most of the grain reaches the sieve further in front than the lighter impurities, carried back by the air flow.

SUMMARY

One embodiment is a sieve for a harvester, wherein the sieve has a plurality of louvers and a plurality of cross members adjacent to each one of the plurality of louvers. Wherein, each of the cross members have a fluid channel that directs a fluid through the plurality of louvers.

One example of this embodiment includes a controller that selectively provides fluid to the fluid channels of each of the plurality of cross members. In one aspect of this example, the controller independently controls the flow rate of the fluid provided to each of the fluid channels of each of the plurality of cross members.

Another example of this embodiment includes a manifold coupled to each of the plurality of cross members. In one aspect of this example, the manifold is positioned along a substantially central portion of the plurality of cross members. In yet another aspect of this example, the manifold is coupled to the harvester.

In yet another example, the plurality of louvers and the plurality of cross members do not substantially move relative to a frame of the harvester during a harvest operation.

Another embodiment is a stationary sieve for a harvester that has a plurality of louvers, a plurality of cross members, fluid channels defined in each of the plurality of cross members, and at least one orifice in each of the plurality of cross members that directs fluid from the fluid channels to between the plurality of louvers. Wherein, the plurality of louvers remain spatially fixed relative to a harvester frame during a harvest operation.

One example of this embodiment includes a controller, a fluid source, and a valve assembly in communication with the controller that selectively provides a fluid from the fluid source to the fluid channels. In one aspect of this example, the controller selectively couples the fluid channels to the fluid source with the valve assembly in a cyclic pattern. In another aspect of this example, the controller selectively couples at least one of the fluid channels to the fluid source at a first cyclic pattern, and another of the fluid channels to the fluid source at a second cyclic pattern, wherein the first cyclic pattern is not the same as the second cyclic pattern.

In another example of this embodiment, the valve assembly includes a valve controlled by the controller at each of the plurality of cross members.

Yet another example of this embodiment is a manifold that selectively couples the fluid channels to one another. In one aspect of this example, the manifold couples the sieve to the harvester frame.

Yet another embodiment is a harvester for harvesting and cleaning a crop from an underlying surface during a harvesting operation, wherein the harvester has a chassis coupled to at least one ground engaging mechanism, a cutting head coupled to the chassis to cut the crop, a crop processing arrangement coupled to the chassis and configured to move the crop to at least one sieve, wherein the sieve has a plurality of louvers and a plurality of cross members adjacent to each one of the plurality of louvers and a fluid channel defined in each of the plurality of cross members that directs a fluid through the plurality of louvers, a blower positioned to blow air over at least a portion of the at least one sieve, a clean crop routing assembly that collects cleaned crop portions, and a crop debris routing assembly that collects and spreads crop debris along the underlying surface. Wherein, fluid is supplied to the fluid channels in a cyclic pattern to separate cleaned crop portions from the crop debris.

In one example of this embodiment, the sieve does not substantially move relative to the chassis during the harvesting operation.

Another example of this embodiment has a plurality of fluid valves coupled to the plurality of cross members. In one aspect of this embodiment, each fluid channel from each of the plurality of cross members is independently fluidly coupled to a fluid source through one of the plurality of fluid valves.

Another example of this embodiment has a manifold coupling each of the plurality of cross members to one another. In one aspect of this example the manifold is positioned along a substantially central portion of the sieve.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
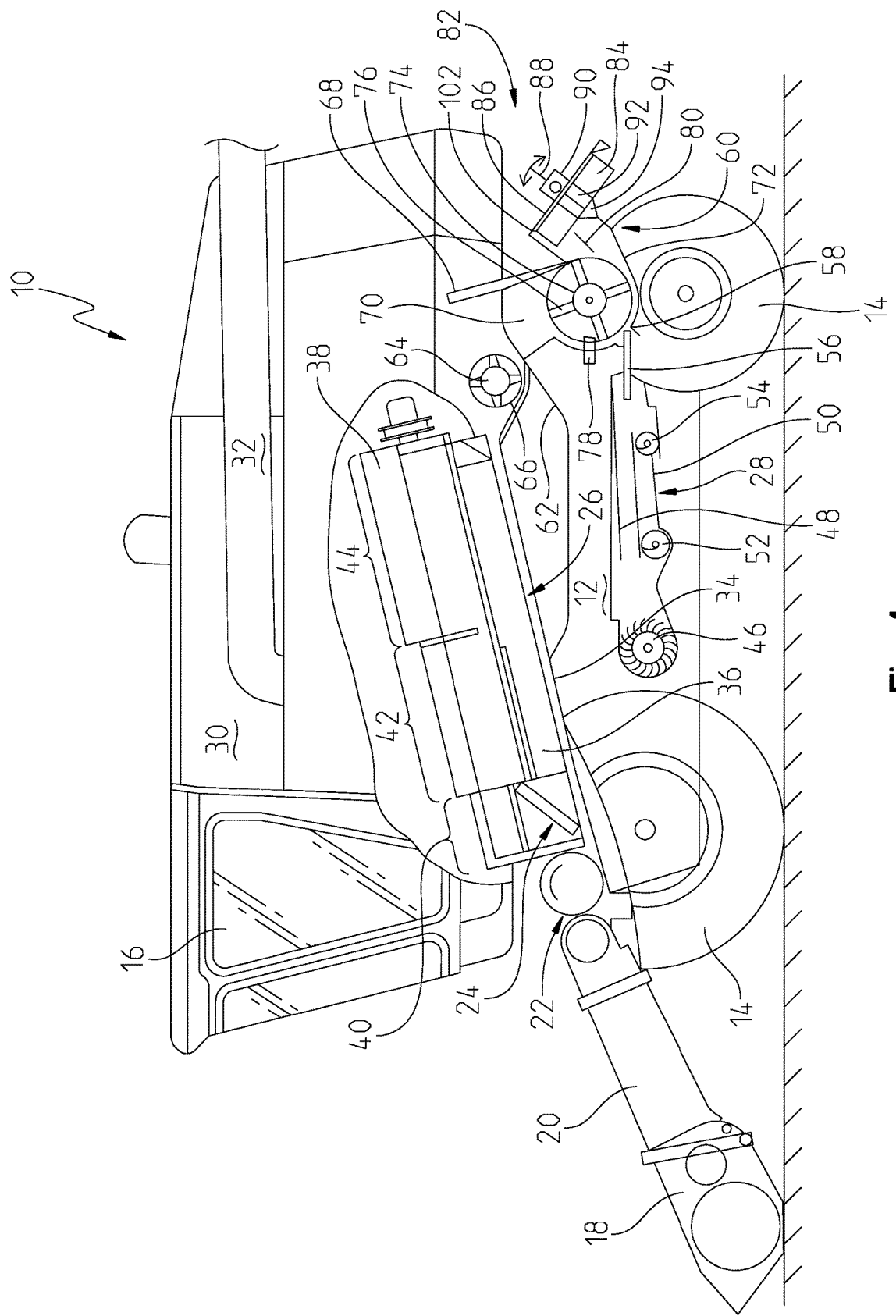
FIG. 1 is a partial section of a side view of a combine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an embodiment of a harvester or agricultural combine 10 is shown with a chassis or frame 12 with one or more ground engaging mechanism such as wheels 14 which are in contact with the underlying surface or ground. Wheels 14 are coupled to the frame 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutting head 18 is disposed at a forward end of the combine 10 and is used in order to harvest crop such as corn and to conduct it to a slope conveyor 20. The harvested crop is conducted by a guide drum 22 from the slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn, chaff, and the like that fall through a thresher basket associated with the threshing section 42 and through a separating grate associated with the separating section 44 may be directed to a clean crop routing assembly 28 with a blower 46 and sieves 48, 50 with louvers. The sieves 48, 50 can be oscillated in a fore-and-aft direction. The clean crop routing assembly 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by means of an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by means of an oscillating sheet conveyor 56 to the rear and to a lower inlet 58 of a crop debris routing assembly 60.

The aforementioned blower 46 produces an air flow that carries much of the chaff and small particles to the rear of the combine and to the crop debris routing assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the clean crop routing assembly 28. A wall 68 is located to the rear of the ejection drum 64. The wall 68 guides the straw into an upper inlet 70 of the crop debris routing assembly 60.

The crop debris routing assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the crop debris routing assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the crop debris routing assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

Figure 2:
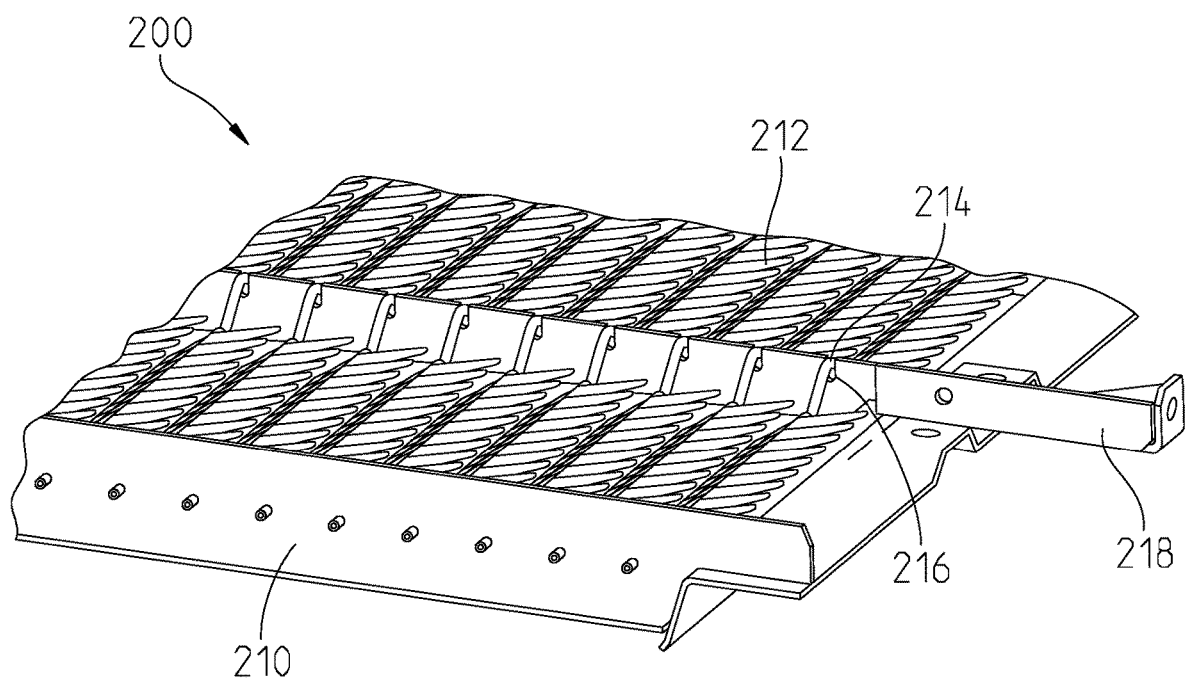
FIG. 2 is partial section view of a sieve.

Referring now to FIG. 2, a partial view of a typical sieve assembly 200 is illustrated. The sieve assembly 200 includes a rectangular frame 210 with louvers or plates 212, positioned along rows that are perpendicular to the longitudinal axis of the frame 210. The plates 212 are connected with crankshafts 214 and the crankshafts 214 engage a slot 216 defined in an adjusting rod 218. The Adjusting rod 218 can move in a longitudinal direction of the sieve assembly 200 with a manual or externally operated drive, so as to adjust the angle of the plates 212 and thus the opening size defined between adjacent plates 212. Adjusting the angle of the plates 212 may alter the distance between the lower side of first plate 212 and the upper side of an adjacent plate 212. The angle of the plate 212, and coincidentally the space there between, may be adjustable to adapt to the individual harvesting conditions, such as grain size, lateral slope, and throughput among other things.

Figure 3:
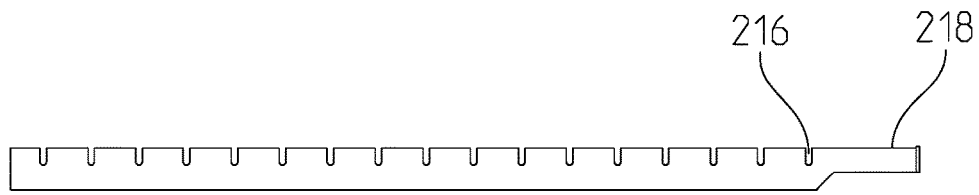
FIG. 3 is a side view of an adjusting rod of the sieve of FIG. 2.
Figure 4:
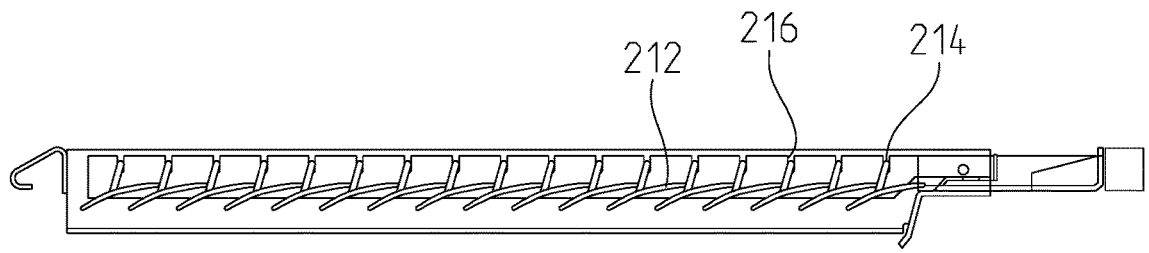
FIG. 4 is a section side view of the sieve of FIG. 2.

The plates 212 are cut in an undulating manner on their back ends and are also curved in an undulating manner in the transverse direction of longitudinal axis. As can be seen in FIG. 3, which shows a side view of a conventional adjusting rod 218, and in FIG. 4, which shows a longitudinal section through a conventional sieve assembly 200, the plates 212 of the sieve assembly 200 have substantially the same spacing along the longitudinal axis. As explained above, the sieve assembly 200 may typically be moved in a cyclic pattern relative to the frame 12 to disturb the grain and MOG mixture to separate the clean grain from the MOG along the sieve.

Figure 5:
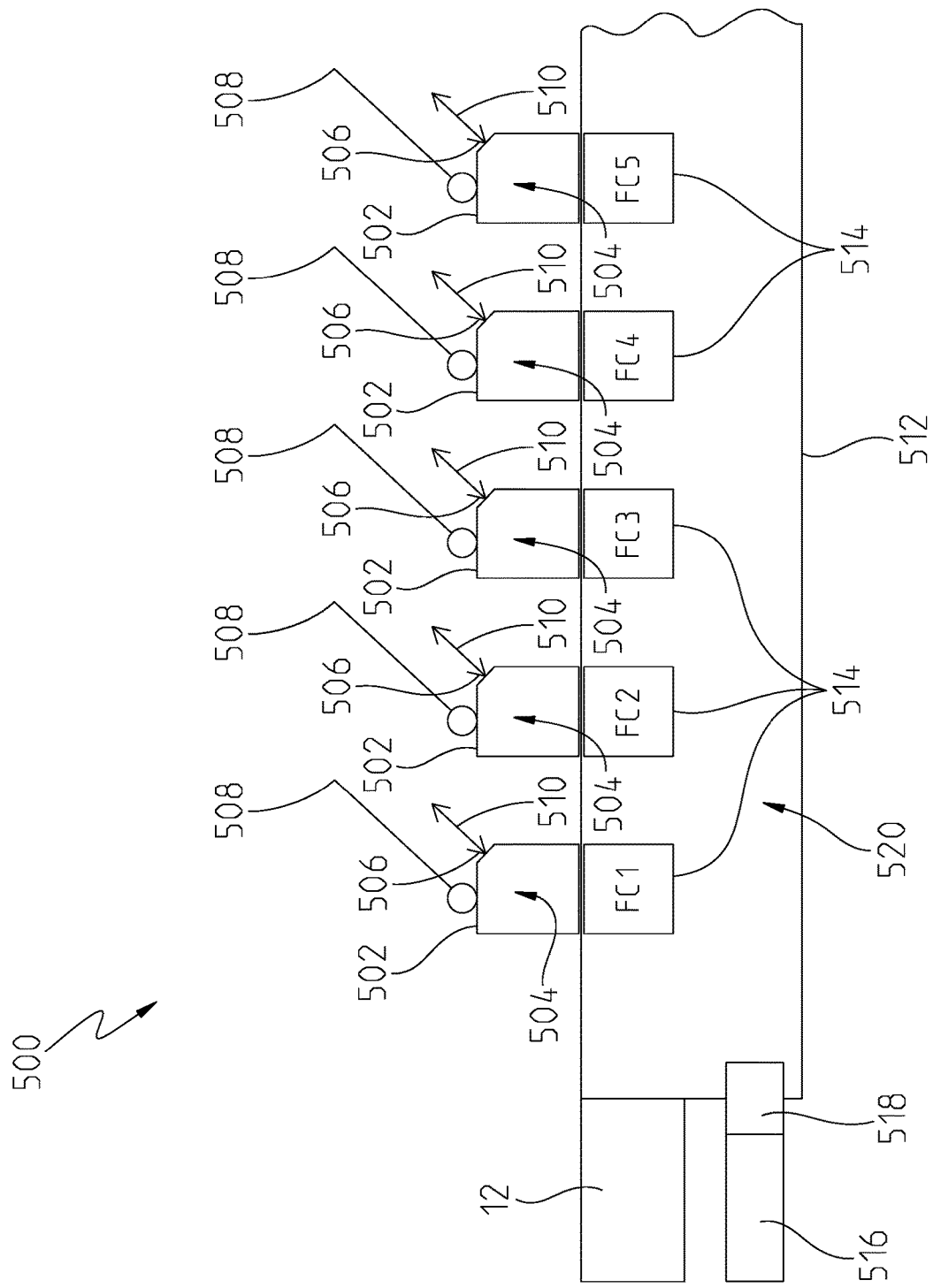
FIG. 5 is a partial section view of another embodiment of a sieve.

Referring now to FIG. 5, one embodiment of a sieve assembly 500 of the present disclosure is illustrated. The sieve assembly 500 may have a plurality of cross members 502 that are substantially perpendicular to the longitudinal axis of the combine 10. Each of the plurality of cross member 502 may have a cross member channel 504 defined therein and have at least one orifice 506 that directs fluid out of the cross member 502 and past one or more plurality of louvers 508 in a discharge direction 510. The cross member channel 504 defined in each of the plurality of cross members 502 may be selectively fluidly coupled to a manifold 512 by a fluid channel valve 514. Further, the manifold 512 may be selectively fluidly coupled to a fluid source 516, such as a blower or the like, through a manifold valve 518. Any one or more of the fluid channel valves 514 and the manifold valve 518 may be controlled by a controller 702 to selectively provide fluid from the fluid source 516, into the manifold 512, into the cross member channels 504 defined by the cross members 502, and out the corresponding orifices 506 in the discharge direction 510.

Figure 6:
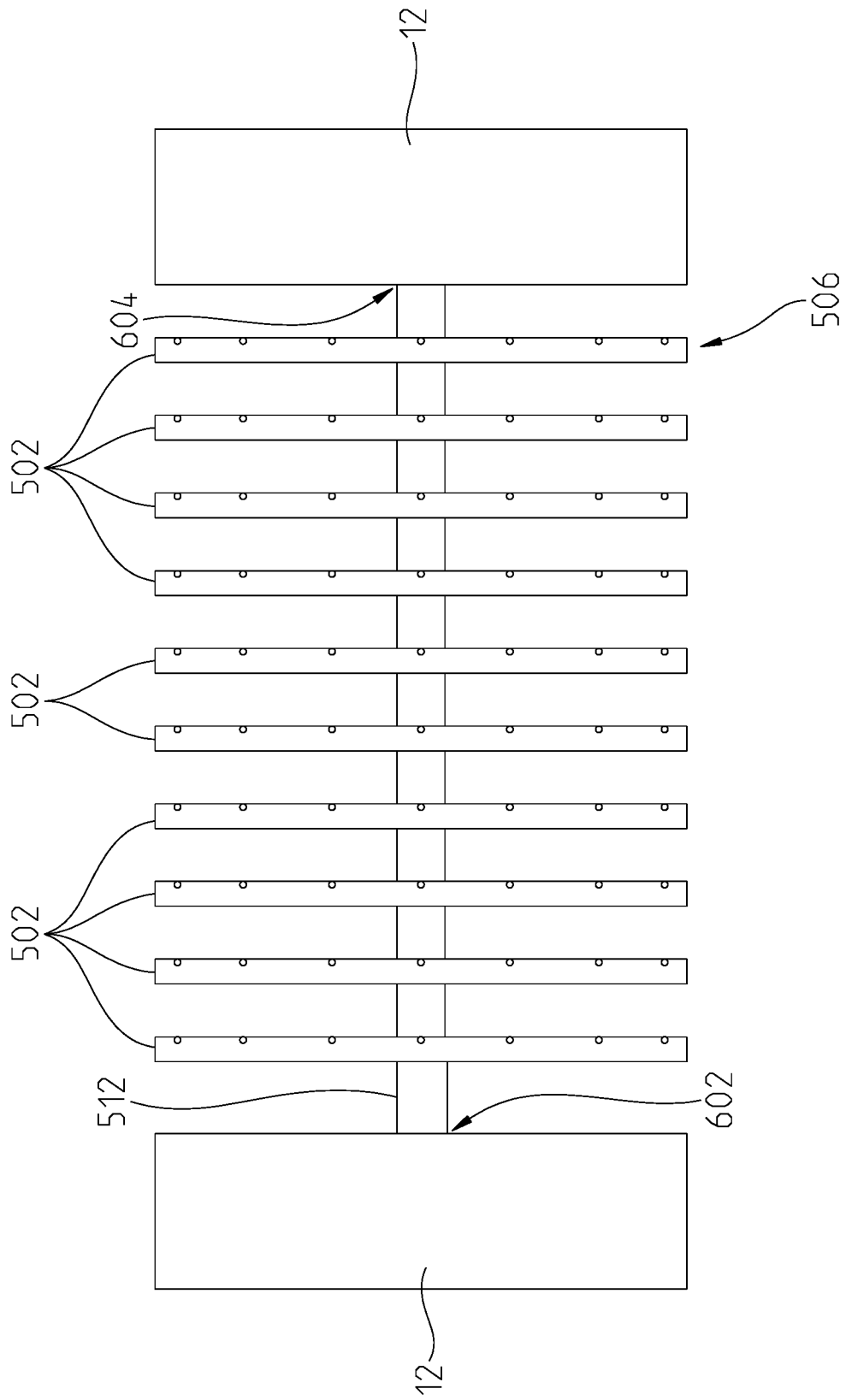
FIG. 6 is a top view of a sieve assembly coupled to a harvester.

Now referring to FIG. 6, the arrangement of the manifold 512 with the plurality of cross members 502 for one embodiment of the present disclosure is illustrated with the plurality of louvers 508 removed. More specifically, the manifold 512 may extend along the longitudinal axis of the combine 10 at a substantially central portion of the plurality of cross members 502. Further, the manifold 512 may be coupled to the frame 12 of the harvester 10 on both a first side 602 and a second side 604. The manifold 512 may be formed of a sufficiently thick material to structurally support the plurality of cross members 502 thereon without substantially deflecting or otherwise bending between the first and second side 602, 604. In one aspect of this disclosure, the manifold 512 is coupled to the harvester 10 along a bottom portion or lower chassis of the combine. In another aspect of this disclosure, the manifold 512 may be coupled to the harvester 10 along a top portion under the crop processing arrangement 26.

The manifold 512 may also form a manifold channel 520 therein. The manifold channel 520 may be a channel defined within the manifold 512 to ensure fluid defined therein is selectively directed towards the orifices 506 of the plurality of cross members 502. More specifically, the manifold channel 520 may be constructed walls that are substantially fluid-tight, wherein fluid can only pass into, or out of, the manifold channel 520 through the manifold valve 518 and the one or more fluid channel valves 514. In other words, the manifold 512 may provide both structural support to the sieve assembly 500 while also defining the manifold channel 520 therein.

Each cross member 502 may similarly provide the cross member channel 504 therein. The cross member channel 504 may extend the length of the cross member 502 and provide a channel to fluidly couple each of the orifices 506 to the manifold channel 520 through the corresponding fluid channel valve 514. As one non-exclusive example, each of the cross members 502 may be formed from a hollow aluminum extrusion that defines the cross member channel 504 therein. However, any known material and method of forming a channel is also considered herein.

In one aspect of this disclosure, the plurality of louvers 508 may be pivotally coupled to a portion of the corresponding cross member 502 by a louver pivot 524. In this configuration, the cross member 502 may provide a structural support to the corresponding louver 508. Further, by positioning the louver pivot 524 on the cross member 502, the location of the louver pivot 524 relative to the orifice 506 remains the same regardless of the angular rotation of the louver 508. In other words, pivotally coupling the louver 508 to the cross member 502 at the louver pivot 524 ensures a consistent relationship between the louver 508 and the corresponding orifice 506. Accordingly, performance of the sieve assembly 500 may be consistently predicted based on the angular orientation of the plurality of louvers 508 relative to the corresponding orifices 506 and the discharge direction 510 of the fluid.

The plurality of cross members 502 may be formed of any material that is capable of defining the cross member channel 504 therein while simultaneously providing structural support to the corresponding plurality of louvers 508. Accordingly, while aluminum is specifically mentioned above, the plurality of cross members could be formed of any type of material known in the art that is capable of performing as described herein. Further, any number of cross members 502 may be positioned along the manifold 512 and each cross member 502 may have a cross member channel 504 defined therein. Accordingly, while FIG. 6 shows a defined number of cross members 502, this disclosure consider implementing more and less cross members 502 to address different crop types, field conditions, work machine sizes, and any other crop or machine variable that may change depending on the application.

In one aspect of this disclosure, the plurality of louvers 508 may utilize the same or similar crankshafts 214, slots 216, and adjusting rod 218 described above for the sieve assembly 200 to alter the angle of the plurality of louvers 502. However, any known method for maintaining or adjusting the angle of the plurality of louvers 508 is considered herein. Further, unlike the sieve assembly 200, the sieve assembly 500 may be intended to remain stationary relative to the frame 12 of the harvester 10. Accordingly, the manifold 512 and cross members 502 coupled thereto may be substantially rigidly mounted at a fore and aft or first and second end 602, 604 to the frame 12 of the harvester 10 and remain substantially stationary relative thereto.

Figure 7:
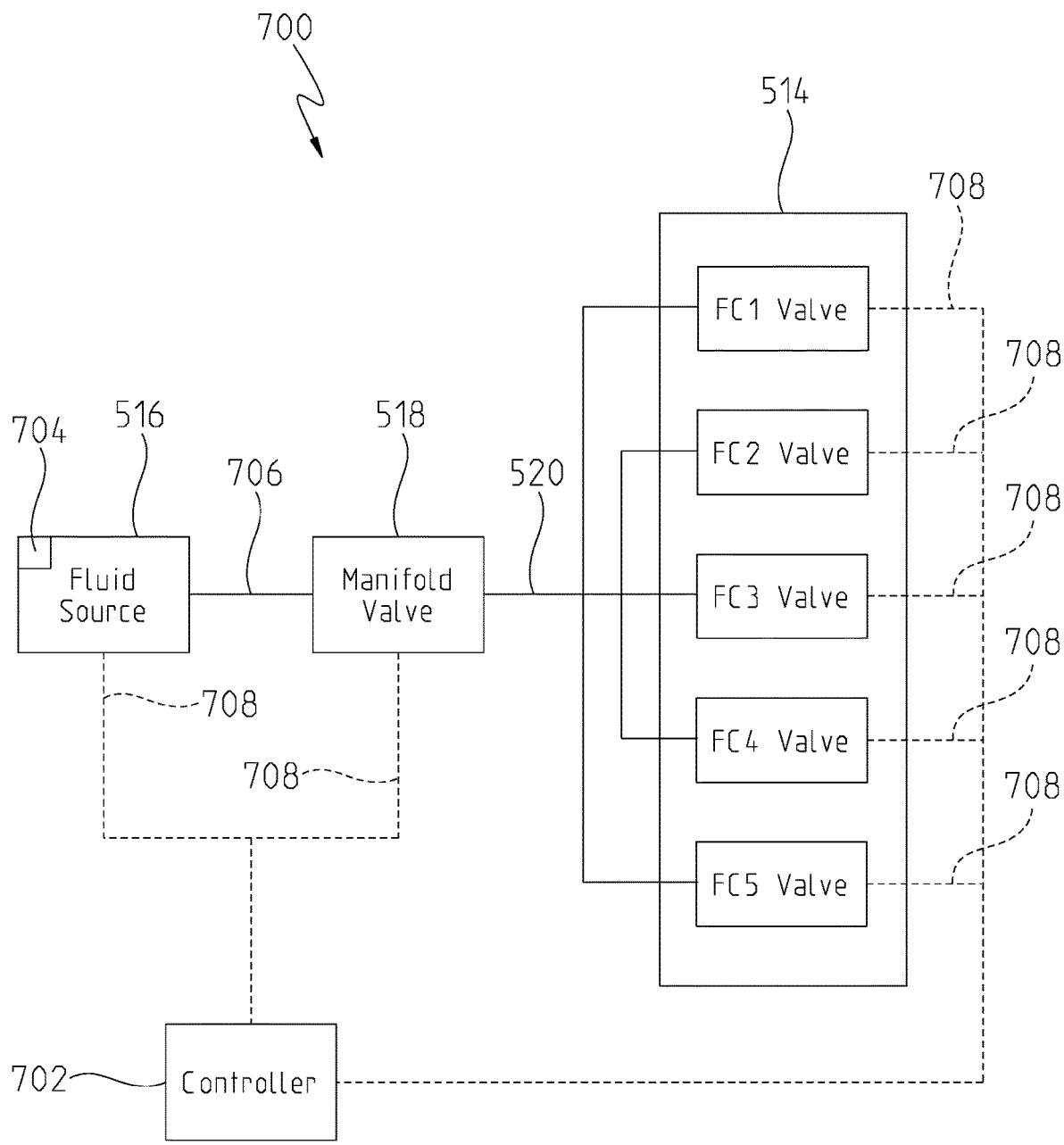
FIG. 7 is a schematic view of components of the sieve assembly of FIG. 5.

Referring now to FIG. 7, one embodiment of an electro-pneumatic assembly 700 is illustrated utilizing the teachings of this disclosure. More specifically, the controller 702 may be in communication with the fluid source 516, the manifold valve 518, and one or more fluid channel valves 514. In one non-exclusive example, the fluid source 516 may be a blower 704. The blower 704 may be a blower dedicated to the sieve assembly 500 or it may be the blower 46 configured to provide the necessary fluid pressure and flow to the sieve assembly 500. Additionally, the fluid source 516 can be provided by any one or more of a cleaning fan, a dedicated air compressor, an air reservoir, a seed fan, or any other fan, reservoir, or fluid device capable of providing a fluid flow and pressure to the sieve assembly 500.

The fluid source 516 may be fluidly coupled to the manifold valve 518 via a fluid channel 706. The fluid channel 706 may be a hose, pipe, ductwork, or any other fluid directing assembly capable of directing pressurized fluid from the fluid source 516 to the manifold valve 518. The manifold valve 518 may be coupled directly to the manifold 512 or located remotely therefrom. If the manifold valve 518 is located remotely from the manifold 512, a manifold connecting hose or other fluid channel may be utilized to direct fluid from the fluid source 516 to the manifold channel 520 when the manifold valve is in an open orientation.

The manifold valve 518 may have an opened orientation and a closed orientation. In the opened orientation, fluid provided by the fluid source 516 may be fluidly coupled to the manifold channel 520 to thereby be directed through any opened fluid channel valves 514. However, when the manifold valve 518 is in the closed orientation, the pressurized fluid provided from the fluid source 516 may be isolated from the manifold channel 520. Accordingly, the fluid provided from the fluid source 516 will not be fluidly coupled to the cross members 502 of the manifold 512 regardless of the position of the fluid channel valve 514 when the manifold valve 518 is closed. In other words, if the manifold valve 518 is closed, the fluid channel valves 514 cannot be fluidly coupled to the fluid source but if the manifold valve 518 is opened the fluid channel valves 514 selectively allow fluid to be discharged from the corresponding orifices 506.

The manifold valve may be fluidly coupled to the manifold channel 520 as described above and each fluid channel valve 514 may be positioned between the manifold channel 520 and the corresponding cross member channel 504. In this configuration, when the manifold valve 518 is open, each fluid channel valve 514 may selectively allow fluid to be directed out the corresponding orifices 506. Accordingly, in one aspect of this disclosure fluid may be selectively directed from the fluid source to each of the cross members 502 individually via the corresponding fluid channel valve 514.

The controller 702 may also be in communication with the fluid source 516, the manifold valve 518 and each of the plurality of fluid channel valves 514 via one or more communication link 708. The communication link 708 can be any known communication protocol that allows the controller 702 to send commands to the corresponding components and receive feedback therefrom. In one non-exclusive example, the communication link 708 can be a wire harness that is part of a CAN bus or the like. In other embodiments, the communication link 708 can be a wireless protocol such as Bluetooth, Wi-Fi, or any other known wireless signal capable of transferring data.

Referring now to FIGS. 8a-8d, several exemplary embodiments of the orifice 506 are illustrated. More specifically, FIG. 8a may be one example of a cross member 502 that has a substantially continuous orifice 506 across the width of the cross member 502. The orifice 506 of FIG. 8a may be positioned on a portion of the cross member 502 so that the discharge direction 510 is away from the cross member 502 and past any louvers 508 coupled thereto (louvers 508 not illustrated in FIGS. 8a-8d). The orifice 506 of FIG. 8a may be sized to correlate with the fluid flow and pressure produced by the fluid source 516. More specifically, the orifice 506 may be sized to provide fluid flow in the discharge direction 510 that is sufficient to agitate any grain and MOG positioned along the sieve assembly 500 to thereby separate the grain and MOG.

Figure 8B:
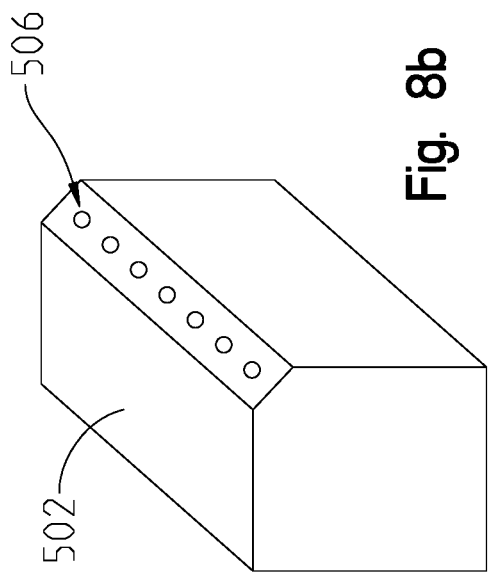
FIG. 8b is another embodiment of an orifice of a cross member.

FIG. 8b shows another embodiment of the present disclosure wherein a plurality of orifices 506 are defined along the width of the cross member 502. In the embodiment of FIG. 8b, each orifice 506 may have substantially the same shape. Further still, in one non-exclusive example each orifice 506 of FIG. 8b may have a circular cross section with substantially the same diameter. The diameter of the orifices 506 of FIG. 8b may be sized to correlate with the fluid flow and pressure produced by the fluid source 516. More specifically, the diameter may be sized to provide fluid flow in the discharge direction 510 that is sufficient to agitate any grain and MOG positioned along the sieve assembly 500 to thereby separate the grain and MOG.

Figure 8D:
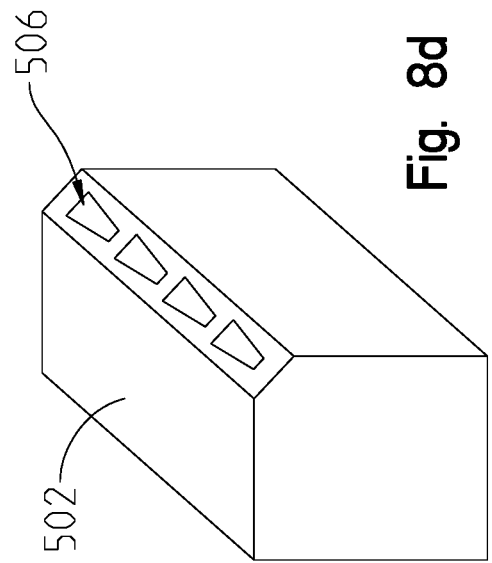
FIG. 8d is another embodiment of an orifice of a cross member.
Figure 8A:
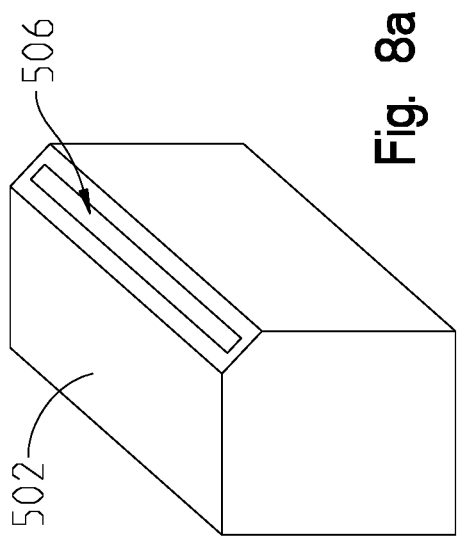
FIG. 8a is one embodiment of an orifice of a cross member.
Figure 8C:
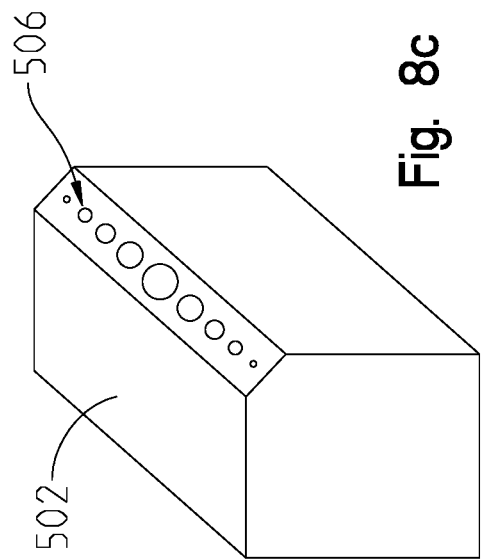
FIG. 8c is another embodiment of an orifice of a cross member.

FIG. 8c may similarly have a plurality of orifices 506 with a circular cross section. However, the orifices of FIG. 8c may have varying diameters across the width of the cross member 502. In one non-exclusive example, the diameter of the orifices 506 along the central portion of the cross member 502 may be greater than the diameter of the orifices along the edges. Alternatively, the diameter of the orifices 506 in the central portion may be smaller than the diameter of the orifices 506 along the edges. The diameter of the orifices of FIG. 8c may be altered to manipulate the velocity of the fluid as it exits in the discharge direction 510 to thereby alter the effect of the fluid on the grain and MOG. For example, a smaller diameter orifice 506 may provide a higher velocity fluid discharge than a larger orifice 506. The higher velocity fluid discharge may be effective in particularly directing the grain and MOG but less capable of handling large volumes of material compared to a larger diameter orifice 506. Accordingly, the diameter of the orifice 506 may vary to address the particular discharge profile needed by the application.

FIG. 8d shows an embodiment having a plurality of orifices 506 that have nozzles positioned thereon. Each nozzle may be on a pivot or the like to selectively alter the discharge direction of each orifice 506 independently from one another. Each nozzle may be repositionable to alter the fluid velocity of fluid discharged therefrom. In one non-exclusive example of the embodiment of FIG. 8d, a user may selectively alter the fluid discharge velocity and direction of each nozzle at each orifice 506 to accommodate the needs of the harvester 10.

Figure 9:
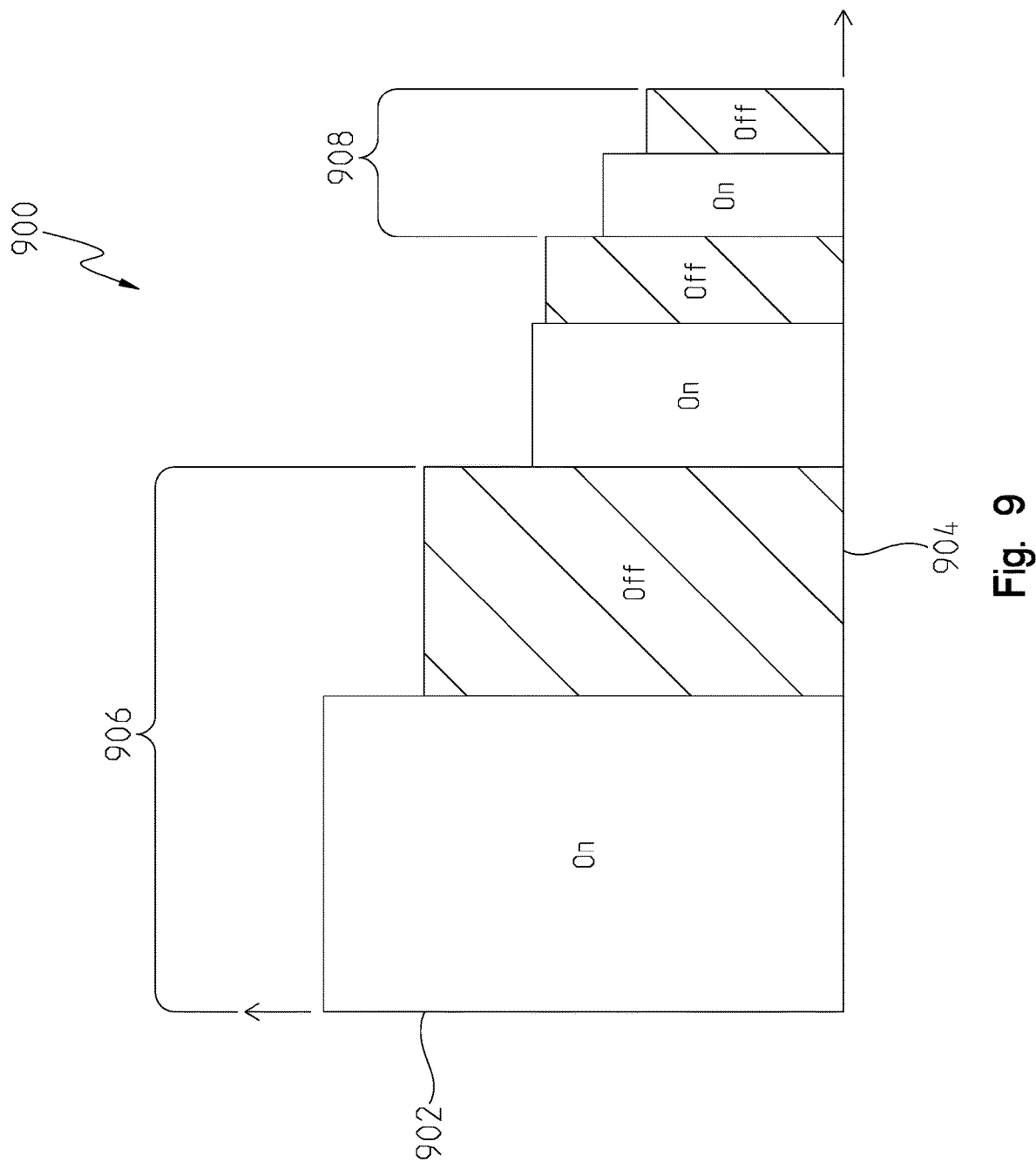
FIG. 9 is one embodiment of a valve control chart.

In one aspect of this disclosure, each of the manifold valve 518 and the plurality of fluid channel valves 514 may be capable of varying the flow rate and pressure provided to the corresponding channels 504, 520 from the fluid source 516 to thereby alter the velocity of the fluid as it exits the orifice 506. In this example, the controller 702 can store operation parameters and instruct the corresponding valves 514, 518 to operate under preset pressures or flow rates. Further still, with reference to FIG. 9, one example of a valve control chart 900 is illustrated. The valve control chart 900 may have an air burst velocity or force 902 on one axis and a time or location 904 on the other. The controller 702 may control any of the valves 514, 518 or the fluid source 516 based on the valve control chart 900.

This disclosure may be implemented to effectively clean and separate harvested grain from MOG without requiring the sieve assembly 500 to move relative to the frame 12 of the harvester 10. This may be done by utilizing the controller 702 to manipulate valves 514, 518 to intermittently provide fluid through the orifices 506 in the discharge direction 510. By intermittently providing fluid out of the orifices 506, the grain and MOG may be agitated along the plurality of louvers 508 in a similar manner as when the entire sieve assembly 200 is moved relative to the frame 12 of the harvester 10.

The controller 702 may intermittently provide fluid flow to the cross member channels 504 either by intermittently opening and closing the manifold valve 518 or each corresponding fluid channel valve 514. Further, this disclosure contemplates embodiments that don't have fluid channel valves 514 at all but rather fluidly couple each cross member channel 504 directly to the manifold channel 520. In this embodiment, the fluid pressure provided to the manifold channel 520 through the manifold valve 518 will be substantially equally distributed to each of the cross member channels 504 coupled thereto.

Alternatively, the sieve assembly 500 may not have a manifold valve 518 at all but rather rely on each of the fluid channel valves 514 to intermittently fluidly couple the corresponding cross member channel 504 to the fluid source 516. In this embodiment, the fluid source 516 may be directly fluidly coupled to the manifold channel 520 and the controller 702 may intermittently open and close each of the fluid channel valves 514 to intermittently provide fluid through the orifices 506 of the cross member channels 504.

In one non-exclusive example, there may be at least five cross members 502 coupled to five corresponding fluid channel valves 514 (FC1, FC2, FC3, FC4, FC5). The first fluid channel valve FC1 may correspond with the cross member 502 closest to the cutter head 18. Accordingly, the controller 702 may operate the first fluid channel valve FC1 under a first operation parameter 906. The first operation parameter 906 may intermittently transition the first fluid channel valve FC1 between the closed and opened position for prolonged periods of time and allow for a large amplitude that generates a high velocity discharge at the corresponding orifices by allowing a high pressure of fluid to enter the corresponding cross member channel 504. The controller 702 may implement the first operation parameter 906 to address the large amount of grain and MOG that is likely to become positioned along the sieve 500 at the cross member 502 coupled to the first fluid channel valve FC1.

The controller 702 may progressively alter the air burst velocity and intermittent timing of each of the five corresponding fluid channel valves FC1, FC2, FC3, FC4, FC5. In one non-exclusive example, the controller 702 may reduce the pressure provided to fluid channels farther from the cutter head 18. More specifically, the controller 702 may manipulate the fifth fluid channel valve FC5 at a fifth operation parameter 908. The fifth operation parameter 908 may provide a pressure to the corresponding cross member channel 504 that is reduced compared to the pressure provided in the first operation parameter 906. Similarly, the intermittent timing of the fifth fluid channel valve FC5 may be more frequent compared to the first operation parameter 906. The fifth operation parameter 908 may utilize an amplitude and frequency that is ideal for cross members 502 that are farther from the cutter head 18 and thus less likely to be required to move as much grain and MOG compared to the cross member 502 coupled to the first fluid channel valve FC1. Accordingly, each fluid channel valve FC1, FC2, FC3, FC4, FC5 may be assigned a unique operation parameter 908 to address the expected conditions that correspond with that particular portion of the sieve assembly 500.

In addition to altering the operation parameters, each cross member 502 may have one or more of the orifices 506 shown and described with reference to FIGS. 8a-8d. More specifically, the cross member 502 that corresponds with the first fluid channel FC1 may have an orifice 506 like FIG. 8a while the cross member 502 that corresponds with the fifth fluid channel FC5 may have an orifice 506 configuration similar to any of FIGS. 8b-8c. Accordingly, each cross member 502 may have an orifice 506 configuration that is specifically selected to address the grain and MOG conditions for that portion of the sieve assembly 500, and each cross member 502 may have a different orifice 506 configuration.

In one aspect of this disclosure, the harvester 10 may have two separate sieve assemblies 500 coupled thereto. More specifically, a first sieve assembly 500 may be coupled to the harvester 10 at an upper location. More specifically, the manifold 512 of the first sieve assembly 500 may be coupled to an upper chassis of the harvester 10 or the manifold 512 may be coupled directly to the crop processing arrangement 26. Similarly, a second sieve assembly 500 may be coupled to the harvester 10 along a lower portion of the chassis 12. The second sieve assembly 500 may also be coupled to the chassis 12 by the manifold 512. Accordingly, in this embodiment, the harvester 10 positions the first sieve assembly 500 at least partially above the second sieve assembly 500 similar to the sieves 48, 50 illustrated in FIG. 1. This disclosure contemplates using any number of sieve assemblies 500, and is not limited to using only one or only two but also considers using more than two.

In another aspect of this disclosure, two sieve assemblies 500 may be coupled to one another at the manifolds 512 and be coupled to the harvester 10 at common coupling points. That is to say, a first sieve assembly 500 may be coupled to a second sieve assembly 500 as a combined sieve assembly. The combined sieve assembly may then be coupled to the chassis 12 of the harvester 10, directly to the crop processing arrangement 26, or to any other portion of the harvester 10.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A sieve for a harvester, comprising:
   a plurality of louvers;
   a plurality of cross members adjacent to each one of the plurality of louvers, wherein each of the cross members has a fluid channel that directs a fluid through the plurality of louvers;
   a manifold fluidly coupled to each of the plurality of cross members and fluidly coupled to a fluid source;
   a plurality of fluid channel valves each fluidly coupled between one of the fluid channels and the manifold to selectively supply fluid from the manifold to the one fluid channel; and
   a manifold valve fluidly coupled between the fluid source and the manifold to selectively supply fluid from the fluid source to the manifold.

2. The sieve of claim 1, further comprising a controller that selectively provides fluid to the fluid channels of each of the plurality of cross members.

3. The sieve of claim 2, further wherein the controller independently controls the flow rate or pressure of the fluid provided to each of the fluid channels of each of the plurality of cross members.

4. The sieve of claim 1, further wherein the manifold is positioned along a substantially central portion of the plurality of cross members.

5. The sieve of claim 1, further wherein the manifold is coupled to the harvester to support the plurality of cross members.

6. The sieve of claim 1, further wherein the plurality of louvers and the plurality of cross members do not substantially move relative to a frame of the harvester during a harvest operation.

7. A stationary sieve for a harvester, comprising:
a plurality of louvers;
a plurality of cross members;
fluid channels defined in each of the plurality of cross members; and
at least one orifice in each of the plurality of cross members that directs fluid from the fluid channels to between the plurality of louvers;
wherein, the plurality of louvers remain spatially fixed relative to a harvester frame during a harvest operation.

8. The sieve of claim 7, further comprising:
a controller;
a fluid source; and
a valve assembly in communication with the controller that selectively provides a fluid from the fluid source to the fluid channels.

9. The sieve of claim 8, further wherein the controller selectively couples the fluid channels to the fluid source with the valve assembly in a cyclic pattern.

10. The sieve of claim 9, further wherein the controller selectively couples at least one of the fluid channels to the fluid source at a first cyclic pattern, and another of the fluid channels to the fluid source at a second cyclic pattern, wherein the first cyclic pattern is not the same as the second cyclic pattern.

11. The sieve of claim 8, further wherein the valve assembly includes a valve controlled by the controller at each of the plurality of cross members.

12. The sieve of claim 7, further comprising a manifold that selectively couples the fluid channels to one another.

13. The sieve of claim 12, further wherein the manifold couples the sieve to the harvester frame.

14. A harvester for harvesting and cleaning a crop from an underlying surface during a harvesting operation, comprising:
a chassis coupled to at least one ground engaging mechanism;
a cutting head coupled to the chassis to cut the crop;
a crop processing arrangement coupled to the chassis and configured to move the crop to at least one sieve, wherein the sieve comprises:
a plurality of louvers;
a plurality of cross members adjacent to each one of the plurality of louvers;
a fluid channel defined in each of the plurality of cross members that directs a fluid through the plurality of louvers;
a blower positioned to blow air over at least a portion of the at least one sieve;
a clean crop routing assembly that collects cleaned crop portions;
a crop debris routing assembly that collects and spreads crop debris along the underlying surface;
a plurality of fluid valves coupled to the plurality of cross members;
a manifold coupled between the plurality of fluid valves and a fluid source; and
a manifold valve coupled between the manifold and the fluid source;
wherein, fluid is supplied to the fluid channels in a cyclic pattern to separate cleaned crop portions from the crop debris,
and wherein, each fluid channel is independently fluidly coupled to the fluid source through one of the plurality of fluid valves.

15. The harvester of claim 14, further wherein the sieve does not substantially move relative to the chassis during the harvesting operation.

16. The harvester of claim 14, wherein the manifold couples each of the plurality of cross members to one another.

17. The harvester of claim 16, further wherein the manifold is positioned along a substantially central portion of the sieve.

18. The sieve of claim 1, wherein each of the plurality of cross members includes at least one orifice to discharge fluid out of the cross member and past one or more louvers, and wherein the at least one orifice extends continuously across a width of the cross member.

19. The sieve of claim 7, wherein each of the plurality of cross members includes at least one orifice to discharge fluid out of the cross member and past one or more louvers, and wherein the at least one orifice includes a plurality of orifices having varying diameters across a width of the cross member.

20. The sieve of claim 7, wherein each of the plurality of cross members includes at least one orifice to discharge fluid out of the cross member and past one or more louvers, and wherein the at least one orifice extends continuously across a width of the cross member.

* * * * *